United States Patent
Sugimoto et al.

(10) Patent No.: US 6,417,992 B2
(45) Date of Patent: *Jul. 9, 2002

(54) HEAD ASSEMBLY AND DISK DRIVE

(75) Inventors: Masaharu Sugimoto; Masaki Kameyama; Takeshi Ohwe, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/358,334

(22) Filed: Jul. 21, 1999

(30) Foreign Application Priority Data

Dec. 24, 1998 (JP) .......................... 10-367903

(51) Int. Cl.[7] .............................. G11B 5/60; G11B 21/21
(52) U.S. Cl. ............................. 360/236.2; 360/236.3; 360/236.1; 360/236.9; 360/245.1
(58) Field of Search .................... 360/245.3, 245.6, 360/245, 245.1, 236.1, 235.4, 235.8, 237, 236.3, 236.6, 236.2, 236.9

(56) References Cited

U.S. PATENT DOCUMENTS

| | | | | |
|---|---|---|---|---|
| 4,389,688 A | * | 6/1983 | Higashiyama | 360/104 |
| 4,792,875 A | * | 12/1988 | Ohdaira | 360/104 |
| 5,200,867 A | | 4/1993 | Albrecht et al. | 360/103 |
| 5,243,482 A | * | 9/1993 | Yamaguchi et al. | 360/104 |
| 5,267,104 A | | 11/1993 | Albrecht et al. | 360/97.02 |
| 5,285,337 A | * | 2/1994 | Best et al. | 360/97.02 |
| 5,383,073 A | * | 1/1995 | Masukawa et al. | 360/104 |
| 5,625,514 A | * | 4/1997 | Kubo et al. | 360/104 |
| 5,650,894 A | * | 7/1997 | Ikeda | 360/104 |
| 5,751,515 A | * | 5/1998 | Kasahara | 360/103 |
| 5,835,307 A | * | 11/1998 | Sone | 360/104 |
| 5,841,608 A | * | 11/1998 | Kasamatsu et al. | 360/103 |
| 5,850,320 A | * | 12/1998 | Warmka et al. | 360/104 |
| 5,859,748 A | * | 1/1999 | Itoh | 360/103 |
| 5,870,251 A | * | 2/1999 | Boutaghou | 360/103 |
| 5,923,500 A | * | 7/1999 | Hagen | 360/104 |
| 5,999,369 A | * | 12/1999 | Shimizu et al. | 360/104 |
| 6,040,958 A | * | 3/2000 | Yamamoto et al. | 360/103 |
| 6,185,071 B1 | * | 2/2001 | Asanai et al. | 360/236.6 |
| 6,188,547 B1 | * | 2/2001 | Gui et al. | 360/236.5 |
| 6,212,042 B1 | * | 4/2001 | Gui et al. | 360/236.6 |
| 6,215,621 B1 | * | 4/2001 | Boutaghou | 360/236.6 |
| 6,236,543 B1 | * | 5/2001 | Han et al. | 360/236.6 |
| 6,243,222 B1 | * | 6/2001 | Boutaghou et al. | 360/73.03 |
| 6,243,233 B1 | * | 6/2001 | Yamamoto et al. | 360/236.6 |
| 6,246,538 B1 | * | 6/2001 | Kasamatsu et al. | 360/97.01 |

FOREIGN PATENT DOCUMENTS

| | | |
|---|---|---|
| JP | 5151735 | 6/1993 |
| JP | 612808 | 1/1994 |
| JP | 83221027 | 12/1996 |

* cited by examiner

*Primary Examiner*—Brian E. Miller
(74) *Attorney, Agent, or Firm*—Greer, Burns & Crain, LTD (57) ABSTRACT

A head assembly which can prevent an increase in the frictional force between the head and the recording medium, even if the spindle motor is rotated in the reverse direction during start-up of the disk drive. The head assembly includes a suspension having a roundedly bent portion for generating a spring load and a gimbal located on the suspension. A head slider is mounted on the gimbal. The head slider has an air bearing surface, an air inlet end, and an air outlet end. The spring load of said suspension is applied to the head slider at a load point that is offset from a center of gravity of said head slider. Preferably, the offset load point is located between the center of gravity of the head slider and its air inlet end. Additionally, the head slider preferably includes several pads extending from its air bearing surface, and the offset load point can be located at the center of gravity of the pads (as opposed to the center of gravity of the head slider in its entirety). There are two preferred configurations for realizing the offset load point of the present invention: (1) using a reinforcing plate connected to the suspension, and a pivot formed on the reinforcing plate and kept in pressure contact with the slider mounting portion of the gimbal, such that the pivot applies the spring load to the head slider; and (2) bending the gimbal at a neck portion thereof by a given angle to apply the spring load.

22 Claims, 5 Drawing Sheets

Fig. 1

PRIOR ART

HEAD ASSEMBLY AND DISK DRIVE

The present invention relates generally to a magnetic head assembly including a magnetic head slider having a plurality of pads, and more particularly to a magnetic head assembly capable of preventing stiction of a magnetic head slider to a magnetic disk during the start of rotation of the magnetic disk drive.

BACKGROUND OF THE INVENTION

In recent years, there is a desire for reducing the size and increasing the capacity of magnetic disk drives for use as external storage devices in computers. One method of increasing the capacity of the magnetic disk drive is to increase the number of magnetic disks mounted on a spindle, and in association therewith the spacing between the magnetic disks in recent magnetic disk drives has increasingly been reduced in order to reduce the overall height of the disk drive unit.

In recent magnetic disk drives, flying type magnetic head sliders employing the contact start and stop (CSS) system are frequently used. In such flying type magnetic head sliders with the CSS system, the magnetic head slider comes into contact with the magnetic disk when the disk drive stops rotating, but whereas during rotation, the magnetic head slider is kept flying at a microscopic height from the disk surface by an air flow generated over the surface of the magnetic disk, which rotates at a high speed during the recording or reproduction of information.

In flying type magnetic head sliders with the CSS system, an electromagnetic transducer (i.e., a magnetic head element) is built into the slider, which receives the air flow generated over the disk surface. To maintain the slider in position, it is supported by a suspension. Accordingly, when the magnetic disk is not being rotated, the slider (including the electromagnetic transducer) is in contact with the disk surface, whereas when the magnetic disk is rotated, an air bearing surface of the slider that is opposed to the magnetic disk receives an air flow generated by the rotation of the magnetic disk, and the slider flies a small distance either above or below the disk surface. As a result, the electromagnetic transducer built into the slider is moved over the disk surface while being supported by the suspension, and performs recording or reproduction of information on a given track.

In a magnetic disk drive employing a conventional flying type magnetic head slider, a pair of rails are generally provided along opposite side portions of the surface of the magnetic head slider that opposes the disk surface. Each of these two rails includes a flat air bearing surface. Further, a tapering surface is formed on each rail at its air inlet end portion. The air bearing surface of each rail receives an air flow generated by the high-speed rotation of the magnetic disk, which makes the slider fly above (or below) the disk, maintaining a microscopic distance between the disk surface and the electromagnetic transducer.

With the CSS system, a relatively steady microscopic flying height (in the submicron range) can be obtained when the disk is rotated at a constant speed. However, when the disk is not being rotated, the rail surfaces (air bearing surfaces) of the slider are in contact with the disk. Accordingly, when the magnetic disk drive starts or stops rotating, the air bearing surfaces slide on the surface of the magnetic disk. If the surface roughness of the magnetic disk is low (i.e., if the disk surface is relatively smooth), the contact area between the air bearing surfaces and the magnetic disk surface during periods of non-rotation is large, and there arises a stiction problem between the magnetic head slider and the magnetic disk during the start of rotation of the magnetic disk.

To avoid stiction, the surface roughness of the magnetic disk has conventionally been increased to a suitable level. However, such increases in surface roughness have the drawback of causing an increase in the flying height. Thus, in order to reduce the flying height of the magnetic head slider in response to the requirement for high-density recording, the surface roughness of the magnetic disk needs to be decreased, even though such a decrease in roughness increases stiction in conventional devices.

In general, to improve the durability of the magnetic disk, a protective film made of a hard material such as carbon, and a lubricating layer for reducing friction and wear of the protective film are formed on a recording layer of the disk. Due to the presence of the lubricating layer, friction and wear of the protective film can be reduced. However, when the disk stops rotating, there is a possibility that stiction between the disk and the slider may occur, preventing the disk drive from being restarted.

In association with increases in the amount of information being processed, the developments in high density, large capacity, and compact size magnetic disk drives been remarkable, and the occurrence of stiction has been greatly highlighted as a cause of faulty operation of the disk drive. One of the reasons for such faulty operation is the use of spindle motors with reduced torque (because of their small size). Another reason for such faulty operation is the smoothing out of the disk surface in order to achieve high density recording.

To prevent this stiction problem, it has been proposed to provide a plurality of pads, or projections, on the flying surfaces (i.e., air bearing surfaces) of the slider, thereby reducing the contact area between the slider and the disk surface. In assembling a magnetic head assembly by mounting such a magnetic head slider having a plurality of pads upon a front end portion of a suspension formed of stainless steel, the magnetic head slider is mounted on the front end portion of the suspension so that its load point (the point where the spring load of the suspension is applied to the magnetic head slider) coincides with the center of gravity of the magnetic head slider.

At present, a three-phase Hall-less motor employing no Hall element is generally used as the motor for rotating the spindle. In a CSS type magnetic disk drive, the magnetic head slider comes into contact with the magnetic disk when the disk drive is powered off, as mentioned above. Upon restarting the disk drive, a current is passed through any one of the three-phase coils to position the coil near a permanent magnet. At this time, the motor is rotated in either the forward direction or the reverse direction, depending upon the positional relationship between the coil and the permanent magnet upon stopping of the disk drive, so that the motor is rotated forwardly or reversely by about 60° to position the coil near the permanent magnet. After this positioning, the current passing through each phase is controlled to be switched, thereby continuously rotating the motor in the forward direction. In this manner, the rotating direction of the motor is determined according to the positional relationship between the coil and the permanent magnet upon stopping of the disk drive. Accordingly, the initial reverse rotation of the motor occurs with a probability of about 50%.

Figure 1:
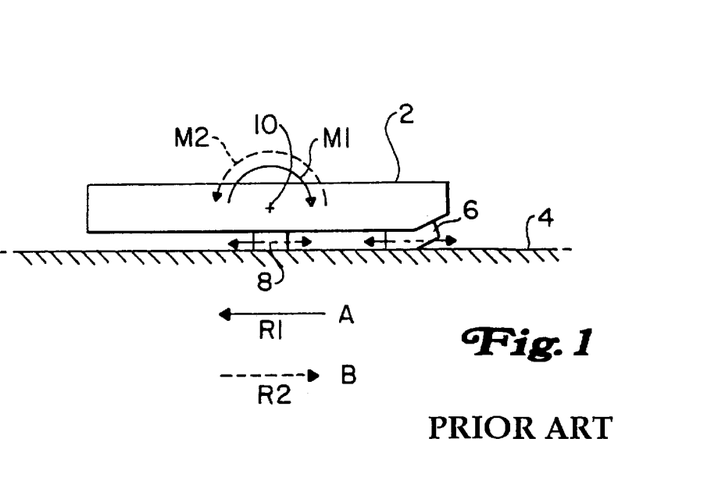
FIG. 1 is a side view of a magnetic head slider, for illustrating a problem in the prior art.

In the case of a magnetic head slider having pads formed on an air bearing surface, it has been found that such reverse rotation of the motor causes the following problem, which will now be described with reference to FIG. 1, which is a schematic side view of a magnetic head slider 2 parked on a magnetic disk 4. FIG. 4, an arrow R1 denotes the forward rotating direction of the magnetic disk 4, and an arrow R2 denotes the reverse rotating direction of the magnetic disk 4. Two pads 6 are formed on the air bearing surfaces of the head slider 2 near the air inlet end of the head slider 2, although only one pad 6 is shown in the FIG. 1 view. Similarly, two pads 8 are formed on the air bearing surfaces of the head slider 2 at an intermediate position between the air inlet end and the air outlet end of the head slider 2, although only one is shown in FIG. 1. In particular, the pad 8 that is formed on the air bearing surface where a head element (transducer) is formed is located at a substantially longitudinally central position of the head slider 2. The reason for locating the pad 8 in such a position is to minimize the spacing between the head element and the magnetic disk 4 during flying of the magnetic head slider 2, thereby reducing wasted space and preventing projection of the pad 8 beyond the minimum flying height of the magnetic head slider 2.

Reference numeral 10 denotes the center of gravity of the slider 2, about which moments are generated when the spindle is rotated. When the spindle is rotated in the forward direction, a clockwise moment M1 (as viewed in FIG. 1) is generated. This clockwise moment M1 causes the pads 6 to be pressed against the magnetic disk 4. In this case, the overhang of the slider 2 that projects between the pads 6 and the lower edge of the air inlet end of the slider 2 is small, so that there is little possibility that this lower edge of the air inlet end of the slider 2 will come into contact with the recording surface of the magnetic disk 4. In other words, if slider 2 is rotated in direction M1, there is little chance that its lower right hand corner (as shown in FIG. 1) will contact the disk 4.

However, when the spindle is reversely rotated during positioning of the coil and the magnet in the Hall-less motor, a counterclockwise moment M2 (as viewed in FIG. 1) is generated. This counterclockwise moment M2 causes the pads 8 and the surfaces on the left-hand side of the slider 2 to be pressed against the magnetic disk 4. As shown in FIG. 1, the overhang of the slider 2 that projects between the pads 8 and the lower edge of the air outlet end of the slider 2 is large, so that there is a significant possibility that this lower edge of the air outlet end of the slider 2 will come into contact with the recording surface of the magnetic disk 4, resulting in an increase in the frictional force between the slider 2 and the magnetic disk 4. In this case, the lower edge of slider 2 being referred to is that shown at the lower left-hand corner, as shown in FIG. 1. Such contact between the lower edge of the slider 2 and the magnetic disk 4 may hinder the ability of the spindle to smoothly start rotating the disk 4.

It is accordingly an object of the present invention to provide a head assembly which can minimize or prevent contact between the slider edges and the disk surface, which prevents increasing the frictional force between the head slider and the recording medium, even during reverse rotation of the spindle motor, during start-up of the disk drive.

It is another object of the present invention to provide a disk drive which can improve the recording density by using a recording medium which has a smooth recording surface, while still reducing the spacing between the head element and the recording medium.

SUMMARY OF THE INVENTION

Briefly, the present invention provides an improved head assembly in which contact between the slider edges and the disk medium is eliminated, or at least minimized, even during reverse rotation, by changing the location of where the spring load is applied to the slider. If the spring load is moved from the center of gravity of the slider to a position between the center of gravity of the slider and the air inlet end of the slider, a moment is created that reduces the effects of the counterclockwise moment M2 (see FIG. 1), whereby counterclockwise rotation of the slider that may occur when the disk medium is rotated in the reverse direction is reduced or eliminated. Accordingly, with the present invention, the probability of contact between the outer edge of the slider and the disk is reduced.

More specifically, the present invention relates to a head assembly (or a disk drive with such a head assembly) that includes a suspension having a roundedly bent portion for generating a spring load with a gimbal located on that suspension, and where the suspension has a slider mounting portion thereon. Additionally, there is a head slider mounted on the slider mounting portion of said gimbal, and the head slider includes an air bearing surface, an air inlet end, and an air outlet end. The spring load of the suspension is applied to the head slider at a load point that is offset from a center of gravity of the head slider, such that the offset load point is located between the center of gravity of the head slider and the air inlet end of said head slider.

Preferably, the head slider also includes several pads extending from its air bearing surface, and the offset load point of the spring load of the suspension is preferably set to substantially coincide with a center of gravity of the plurality of pads. Alternatively, the offset load point may be set to substantially coincide with a position lying on a straight line connecting two of the pads formed near the air inlet end.

There are at least two different configurations for realizing the offset load point of the present invention. The first configuration includes a reinforcing plate connected to the suspension, and a pivot formed on the reinforcing plate and kept in pressure contact with the slider mounting portion of the gimbal, such that the pivot applies the spring load of the suspension to the head slider. In the second configuration, the gimbal is bent at a neck portion thereof by a given angle with respect to the suspension such that the spring load of the suspension is applied to the head slider at the offset load point.

BRIEF DESCRIPTION OF THE DRAWINGS

Preferred embodiments of the present invention are described herein with reference to the drawings wherein.

DESCRIPTION OF THE PREFERRED EMBODIMENTS

Figure 2:
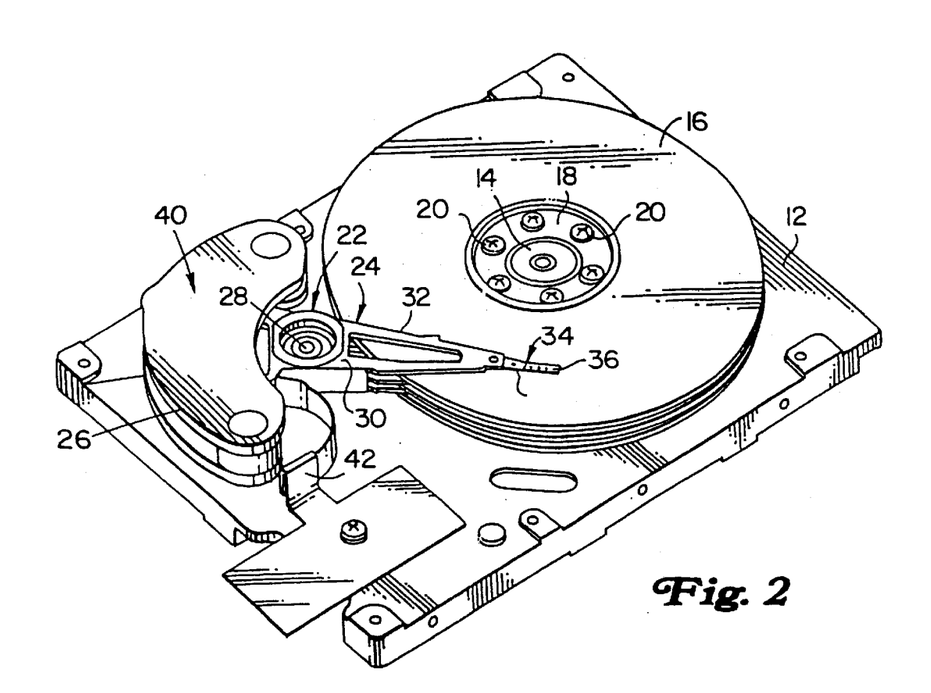
FIG. 2 is a perspective view of a magnetic disk drive of the present invention with its cover removed.

Referring to FIG. 2, there is shown a perspective view of a magnetic disk drive with its cover removed. Reference numeral 12 denotes a base. A shaft 14 is fixed to the base 12. A spindle hub (not shown) is rotatably mounted on the shaft 14 so as to be driven by a Hall-less spindle motor (not shown).

A plurality of magnetic disks 16 and spacers (not shown) are mounted on the spindle hub in such a manner as to be alternately stacked. That is, the plural magnetic disks 16 are fixedly mounted on the spindle hub by securing a disk clamp 18 to the spindle hub by a plurality of screws 20, and these disks 16 are equally spaced apart at a given distance by the spacers.

Reference numeral 22 denotes a rotary actuator consisting of an actuator arm assembly 24 and a magnetic circuit 26. The actuator arm assembly 24 is mounted so as to be rotatable about a shaft 28, which is fixed to the base 12.

The actuator arm assembly 24 includes an actuator block 30 that is rotatably mounted on the shaft 28 through a pair of bearings. The actuator arm assembly 24 further includes a plurality of actuator arms 32 that extend from the actuator block 30 in one direction, and a head assembly 34 that is fixed to a front end portion of each actuator arm 32.

Each head assembly 34 includes a head slider 36 that has a head element (i.e., such as an electromagnetic transducer or an optical element) for reading/writing data from/to the corresponding magnetic disk 16, and a suspension 38 that has a front end portion for supporting the head slider 36 and a base end portion fixed to the corresponding actuator arm 32. A coil (not shown) is supported on the actuator block 30 the opposite side from where the actuator arms 32 extend from. The magnetic circuit 26 and the coil, which is inserted into a gap in the magnetic circuit 26, constitute a voice coil motor (VCM) 40.

Reference numeral 42 denotes a flexible printed circuit board (FPC) for supplying a write signal to the magnetic head element and for taking a read signal from the magnetic head element. The flexible printed circuit board 42 is fixed at one end to a side surface of the actuator block 30.

Figure 3A:
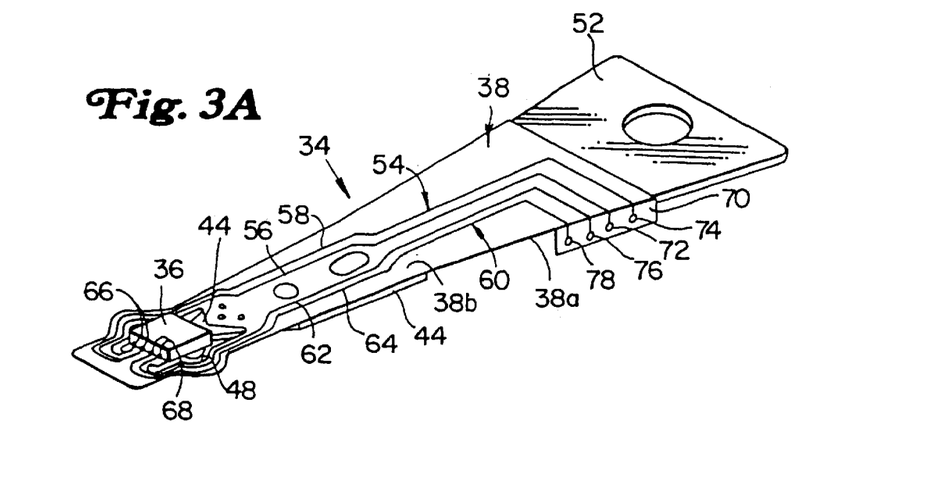
FIG. 3A is a perspective view of a head assembly according to a first preferred embodiment of the present invention.
Figure 3B:
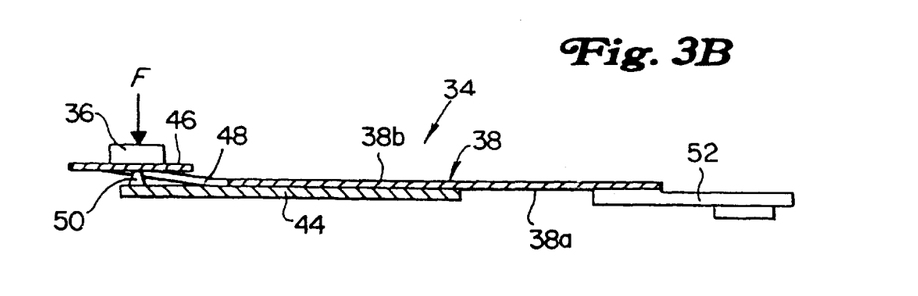
FIG. 3B is a longitudinal sectional view of the head assembly shown in FIG. 3A.

FIG. 3A is a perspective view of a head assembly 34 according to a first preferred embodiment of the present invention, and FIG. 3B is a longitudinal sectional view of the head assembly 34 shown in FIG. 3A.

Reference numeral 38 denotes a suspension, which may be formed of stainless steel, for example. The suspension 38 includes a spring portion 38a and a rigid portion 38b. A reinforcing plate 44 is spot-welded to the lower surface of the rigid portion 38b of the suspension 38.

In the preferred embodiment, the total length of the head assembly 34 is approximately 16.0 mm, and its maximum width is approximately 4.4 mm at its base end where a spacer 52 is affixed. The suspension 38 preferably has a thickness of approximately 22 μm and a weight of approximately 2.4 mg. Note that the preceding dimensions were given for the purposes of illustration only, and it is contemplated that alternate dimensions may also be utilized without departing from the spirit of the invention.

The suspension 38 preferably includes an integrally formed gimbal 46, located near its front end. This gimbal 46 is created by a substantially U-shaped slit 48 formed at the front end portion of the suspension 38 which thereby defines the gimbal 46 inside of the slit 48. A magnetic head slider 36 is fixed to the upper surface of the gimbal 46 by an adhesive or the like.

The spacer 52 (which is used for fixing the head assembly 34 to the corresponding actuator arm 34) is preferably fixed to the base end portion of the suspension 38 by spot welding. A pivot 50 is formed at a front end portion of the reinforcing plate 44. The pivot 50 is in contact with the lower surface of the gimbal 46 to thereby support the magnetic head slider 36. The reinforcing plate 44 preferably has a total length of approximately 5.0 mm, a maximum width of approximately 2.0 mm, a thickness of approximately 30 μm, and an approximate weight of 1.4 mg, although other dimensions and weights are also contemplated as being within the scope of the invention.

The pivot 50 preferably has a height of approximately 50 μm, and the magnetic head slider 36 preferably has a length of approximately 1.2 mm, a width of approximately 1.0 mm, a height of approximately 0.3 mm, and a weight of approximately 1.6 mg. Although, once again, other dimensions and weights are also contemplated.

As shown in FIG. 3B, the gimbal 46 is slightly raised above the upper surface of the suspension 38 by the pivot 50. Accordingly, a preload F is applied to the gimbal 46 when the head slider 36 is in an unloaded condition (i.e., when the slider is not loaded onto the magnetic disk). In this condition, the gimbal 46 is maintained substantially parallel with the suspension 38.

Figure 10:
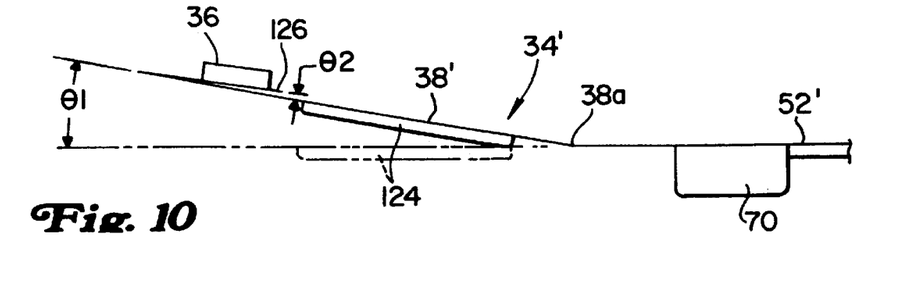
FIG. 10 is a side view of the head assembly according to the second preferred embodiment showing the spring portion with rounded bend therein.

During mounting of the head assembly 34 into the magnetic disk drive, the spring portion 38a of the suspension 38 is bent to form a generally rounded bend as shown in FIG. 10. By bending the spring portion 38a in this rounded manner, the spring load of the spring portion 38a is applied through the pivot 50 to the head slider 36 when the head assembly 34 is mounted in the magnetic disk drive. That is, the tip of the pivot 50 falls at a load point of the spring load.

As shown in FIG. 3A, an MR wiring pattern 54 and a coil wiring pattern 60 are formed by printing upon the upper surface of the suspension 38. The MR wiring pattern 54 consists of a pair of lead lines 56 and 58, and the coil wiring pattern 60 consists of a pair of lead lines 62 and 64. Each of the lead lines 56, 58, 62, and 64 is preferably formed mainly of copper, and preferably gold is deposited on the copper through nickel by evaporation.

The lead lines 56 and 58 have first ends respectively connected to the terminals of a magnetoresistive element (MR element, which will hereinafter be described) in the magnetic head slider 36 by bonding through gold balls 66. On the other hand, the lead lines 62 and 64 have first ends respectively connected to the terminals of a coil (which will hereinafter be described) in the magnetic head slider 36 by bonding through gold balls 68.

A tab 70 is formed at one side edge of the suspension 38, and four terminals 72, 74, 76, and 78 are formed on the tab 70. The terminals 72, 74, 76, and 78 are connected to the second ends of the lead lines 56, 58, 62, and 64, respectively.

Figure 4:
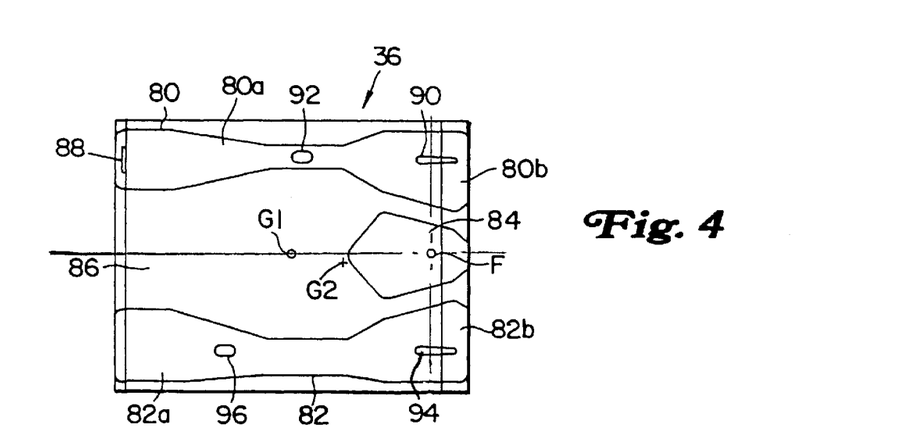
FIG. 4 is a plan view of a head slider of the head assembly shown in FIG. 3A.

Referring now to FIG. 4, there is shown a plan view of the magnetic head slider 36 used in the head assembly 34. A pair of rails 80 and 82 is formed on the surface of the slider 36 that will oppose the surface of the magnetic disk. The rails 80 and 82 respectively have flat air bearing surfaces 80a and 82a for generating a flying force while the disk is rotating. Tapering surfaces 80b and 82b are formed at the air inlet end portions of the rails 80 and 82, respectively. A groove 86 is defined between the rails 80 and 82 to expand the air previously compressed and thereby to generate a negative pressure.

A head element 88 is formed on the air outlet end of the slider 36 at a transverse position adjacent to the rail 80. A center rail 84 is formed between the rails 80 and 82 at a portion near the air inlet end of the slider 36.

Each of the rails 80 and 82 is shaped to have a wider width at its opposite end portions near the air inlet end and the air outlet end, and a narrower width at its longitudinally intermediate portion, thereby suppressing variations in flying height due to changes in the yaw angle. Further, the formation of the tapering surfaces 80b and 82b near the air inlet end of the slider 36 makes it possible to minimize variations in flying height when dust is present upon the magnetic disk.

Two pads 90 and 92 are formed on the air bearing surface 80a of the rail 80, and two pads 94 and 96 are formed on the air bearing surface 82a of the rail 82. The pads 90, 92, 94, and 96 may be formed from diamond-like carbon (DLC), for example.

The pads 90 and 94 are preferably formed near the air inlet end of the slider 36 at the same position with respect to the longitudinal axis of the slider 36. Pad 90 extends across the boundary between the air bearing surface 80a and the tapering surface 80b. Similarly, pad 94 extends across the boundary between the air bearing surface 82a and the tapering surface 82b.

On the other hand, the pads 92 and 96 are preferably formed at different positions from each other along the longitudinal axis. The pads 92 and 96 are preferably located at different positions between the air inlet end and the air outlet end of the slider 36 at such positions where the pads 92 and 96 do not project beyond a minimum flying height (to be hereinafter described) during flying of the slider 36.

More specifically, the pad 92 formed on the rail 80 is preferably shifted toward the air inlet end of the slider 36 in comparison with the pad 96 formed on the rail 82. The positions of the pads 92 and 96 are not located at the same position along the longitudinal axis because the flying height of the rail 80 adjacent to the head element 88 is set to be lower than the flying height of the rail 82. The flying height of the rail 80 can be made smaller than the flying height of the rail 82 by setting the width of the rail 80 to be less than the width of the rail 82, as shown in FIG. 4.

Figure 5A:
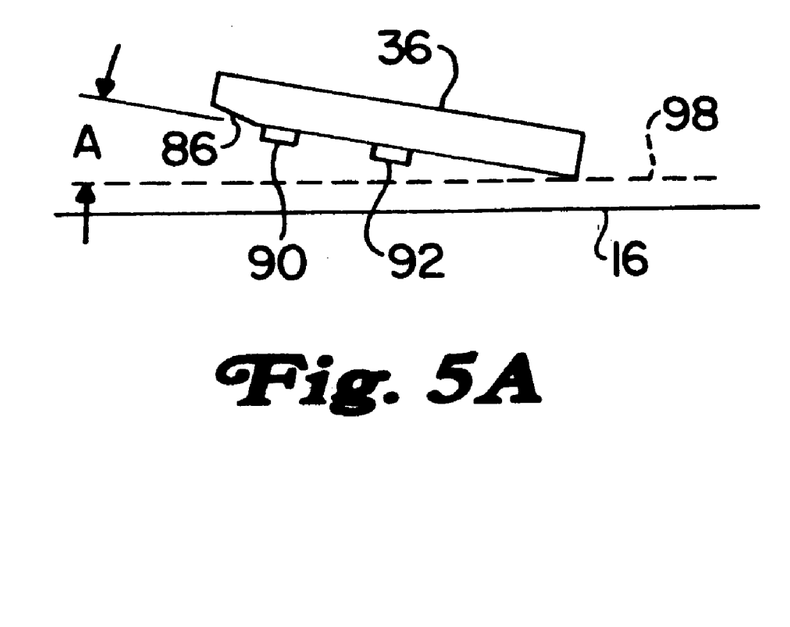
FIG. 5A is a side view of the head slider in its flying condition, showing its pitch angle.
Figure 5B:
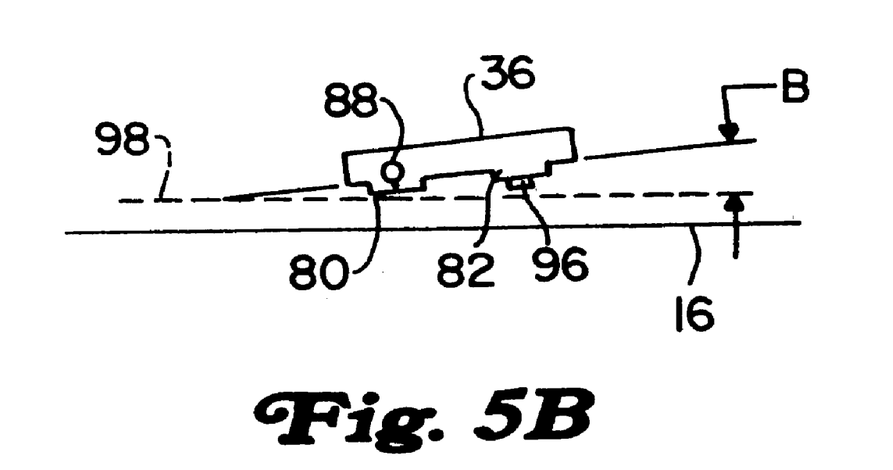
FIG. 5B is an end view of the head slider in its flying condition, showing its roll angle.

Referring to FIGS. 5A and 5B, the flying attitude of the head slider 36 is shown. The head slider 36 is so designed as to have a pitch angle A shown in FIG. 5A and a roll angle B shown in FIG. 5B during its flying condition so that the head element 88 comes closest to the minimum flying height 98 shown by the dashed line. Furthermore, the positions and heights of the pads 90, 92, 94, and 96 are set so that they do not project beyond the minimum flying height 98 during the flying condition of the slider 36.

The pitch angle A is defined as an angle between the longitudinal axis of the slider 36 and a line denoting the minimum flying height 98 during the flying condition of the slider 36 as shown in FIG. 5A, whereas the roll angle B is defined as an angle between a transverse line of the slider 36 and a line denoting the minimum flying height 98 during the flying condition of the slider 36 as shown in FIG. 5B. In the preferred embodiment, the pitch angle A is preferably between 50–200 microradians (and is more preferably between 90–150 microradians), and the roll angle B is preferably between 10–80 microradians (and is more preferably between 20–40 microradians).

Referring again to FIG. 4, reference symbol G1 denotes the center of gravity of the head slider 36. In a conventional head assembly, the head slider 36 is mounted on a suspension so that the load point of the spring load of the suspension coincides with the center of gravity G1 of the head slider 36.

However, such a slider mounting structure in the conventional head assembly has a problem such that if the Hall-less spindle motor is reversely rotated during the start of the rotation of the disk, the lower edge of the air outlet end of the head slider 36 often comes into contact with the magnetic disk surface as mentioned previously.

To solve this problem, in the present invention the pivot 50 is positioned relative to the head slider 36 when fixed to the gimbal 46 so that the load point of the spring portion 38a of the suspension 38 is shifted from the center of gravity G1 of the slider 36 toward the air inlet end of the slider 36.

By setting the position of the pivot 50 closer to the air inlet end as mentioned above, there is generated a moment canceling the moment M2 about the center of gravity G1 of the slider 36 generated by reverse rotation of the spindle as shown in FIG. 1, thereby solving the problem that the lower edge of the air outlet end of the slider 36 may come into contact with the magnetic disk surface at starting the disk drive.

Preferably, the load point is set to coincide with a center of gravity G2 of the pads 90, 92, 94, and 96 (as opposed to point G1, which is the center of gravity of the entire slider 36). Accordingly, the spring load can be uniformly applied to the pads 90 to 96, thereby preventing abnormal wearing of the pads 90 to 96 due to nonuniform contact of the pads 90 to 96 with the magnetic disk surface. Accordingly, it is possible to reduce the wear of each pad due to CSS and to obtain stable flying start characteristics.

As a modification, the load point may be set to coincide with an intersection F of a longitudinally extending center line of the slider 36 and a transverse line connecting the pads 90 and 94 formed near the air inlet end of the slider 36. By shifting the load point to such a position near the air inlet end of the slider 36, it is possible to effectively solve the problem that the lower edge of the air outlet end of the slider 36 may come into contact with the magnetic disk surface. In this preferred embodiment, the load point is determined by the position of the pivot 50 relative to the slider 36.

Figure 6:
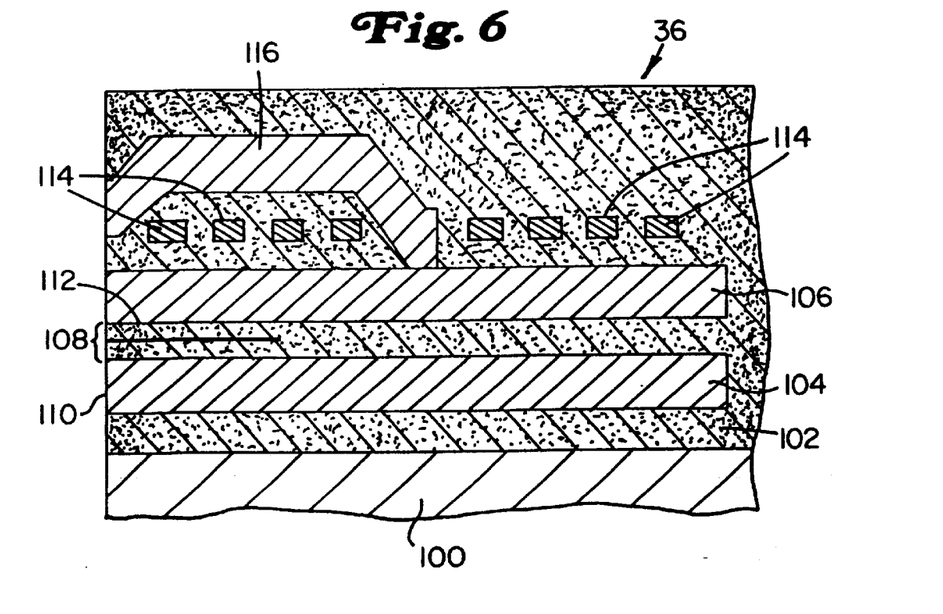
FIG. 6 is a sectional view of an essential part of an MR head mounted on the head slider.

As shown in FIG. 6, the magnetic head slider 36 has a conductive substrate 100 and a nonmagnetic insulating layer 102 formed on the conductive substrate 100. The nonmagnetic insulating layer 102 may be formed of alumina ($Al_2O_3$), for example.

First and second magnetic shields 104 and 106, which may be formed of nickel-iron (Ni—Fe), for example, are embedded in the nonmagnetic insulating layer 102. A gap 108 for improving the reproductive resolution is defined between the first and second magnetic shields 104 and 106 on a front end surface (i.e., the medium opposing surface) 110 of the head slider 36.

A magnetoresistive element (MR element) 112, which may be formed of nickel-iron (Ni—Fe), is embedded in the gap 108 so as to be exposed to the front end surface 110 of the head slider 36. Although not shown, a sense current source is connected to a pair of terminals of the magnetoresistive element 112 to supply a constant sense current to the magnetoresistive element 112.

Reference numeral 116 denotes a magnetic pole having one end exposed to the front end surface 110 of the head slider 36 and the other end connected to the second magnetic shield 106. A conductor coil 114 is wound substantially around a connected portion between the magnetic pole 116 and the second magnetic shield 106.

By passing a current modulated by information to be recorded through the coil 114, a magnetic field having a strength corresponding to the amperage of the modulated current is induced to thereby magnetically record the information on a recording track of the magnetic disk 16.

In reading information recorded on the magnetic disk 16, the magnetoresistive element 112 is used. That is, a signal magnetic flux from a recording track of the magnetic disk 16 is received into the head slider 36 to enter the magnetoresistive element 112 and thereby magnetize it. The magnetic flux passed through the magnetoresistive element 112 is absorbed by the first and second magnetic shields 104 and 106.

The resistance of the magnetoresistive element 112 changes with a change in the magnitude of the signal magnetic flux. Because a constant sense current is supplied from the sense current source to the magnetoresistive element 112, the voltage between the pair of terminals of the magnetoresistive element 112 changes with changes in the resistance. Thus, the information recorded on the magnetic disk 16 can be reproduced as a voltage signal.

Figure 7A:
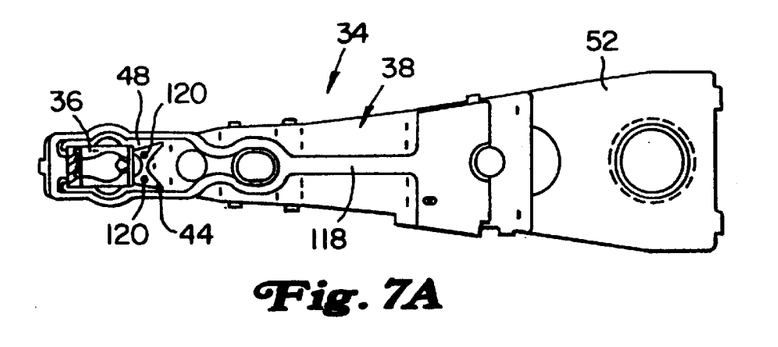
FIG. 7A is a top plan view of the head assembly according to the first preferred embodiment of the present invention, showing details not visible in FIGS. 3A and 3B.
Figure 7B:
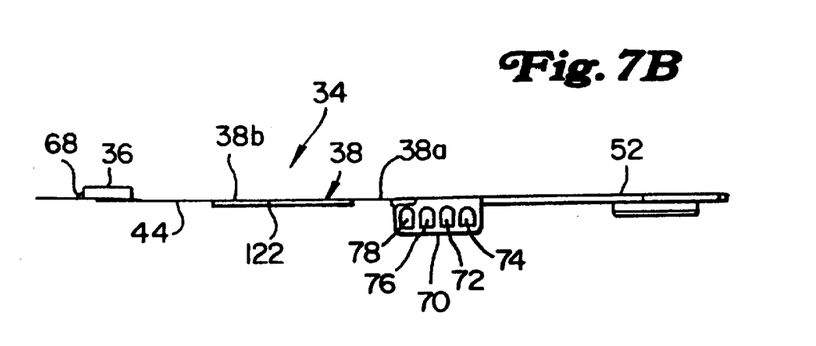
FIG. 7B is a side view of the head assembly shown in FIG. 7A.
Figure 8:
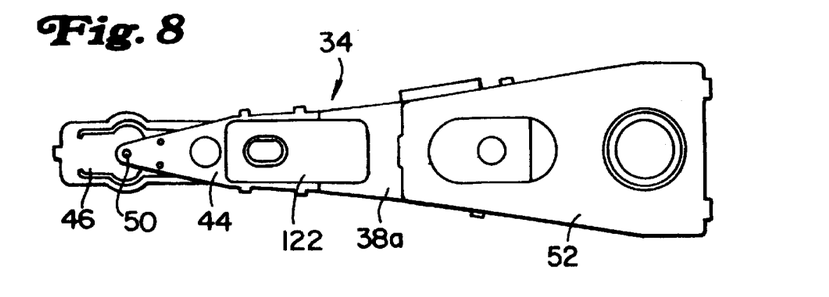
FIG. 8 is a bottom plan view of the head assembly shown in FIG. 7A.

FIG. 7A is a detailed top plan view of the head assembly 34 shown in FIG. 3A, and FIG. 7B is a side view of the head assembly 34. FIG. 8 is a detailed bottom plan view of the head assembly 34.

In FIG. 7A, the MR wiring pattern 54 and the coil wiring pattern 60 are not shown. These wiring patterns are covered with an insulating film 118.

As shown in FIG. 7A, a pair of through holes 120 are formed at a front end portion of the reinforcing plate 44. The through holes 120 can be visually recognized through the slit 48, so that the through holes 120 can be used as reference holes in positioning the head slider 36 on the gimbal 46. In assembling the head assembly 34, the through holes 120 are visually recognized and the head slider 36 is automatically mounted on the gimbal 46 at a given position by an assembly robot.

As shown in FIGS. 7B and 8, a damper member 122 is bonded to the lower surface of the reinforcing plate 44. The damper member 122 may be a piece of double-sided adhesive tape, for example, and is used to improve the balance of the head assembly 34.

Figure 9A:
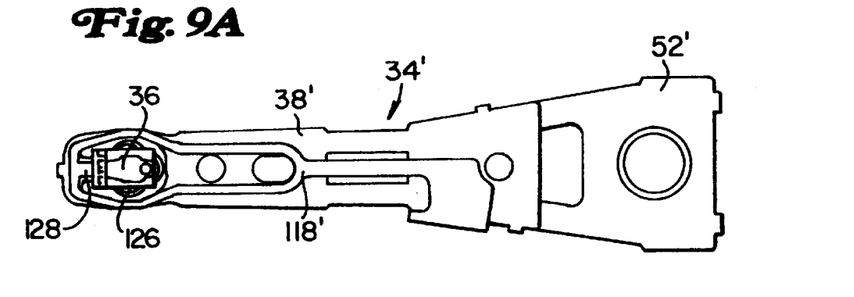
FIG. 9A is a top plan view of a head assembly according to a second preferred embodiment of the present invention.
Figure 9B:
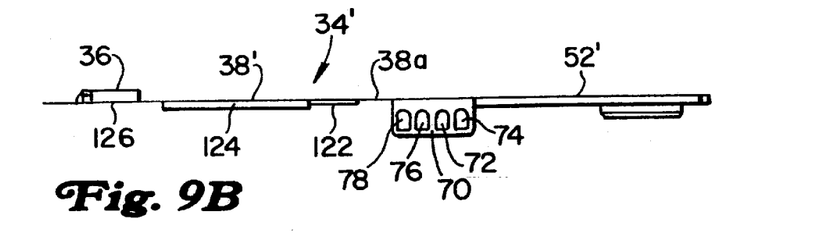
FIG. 9B is a side view of the head assembly shown in FIG. 9A.

Referring to FIG. 9A, there is shown a top plan view of a head assembly 34' according to a second preferred embodiment of the present invention. FIG. 9B is a side view of the head assembly 34'. The head assembly 34' has a suspension 38' preferably formed of stainless steel. The suspension 38' is integrally formed at its front end portion with a gimbal 126 by etching, for example.

Like the first preferred embodiment mentioned above, an MR wiring pattern and a coil wiring pattern (both not shown) are formed on the suspension 38'. These wiring patterns are covered with an insulating film 118'.

A spacer 52' is fixed to a base end portion of the suspension 38', such as by spot welding, for example. The suspension 38' is formed at its opposite side portions with a pair of ribs 124 for imparting rigidity to the suspension 38'. A damper member 122, such as a piece of double-sided adhesive tape, is bonded to the lower surface of the suspension 38'.

Referring to FIG. 10, there is shown a side view of the head assembly 34' in the condition that the spring portion 38a of the suspension 38' is roundedly bent. In mounting the head assembly 34' into the magnetic disk drive, the spring portion 38a of the suspension 38' is roundedly bent by an angle $\theta1$ as shown in FIG. 10. Thereafter, the head assembly 34' is mounted into the magnetic disk drive.

The bending angle $\theta1$ is set to about 10° in a free condition where the head slider 36 is not restricted by the disk. When the head assembly 34' is mounted into the magnetic disk drive, the head slider 36 comes into pressure contact with the corresponding magnetic disk because of the bend of the spring portion 36, so that the spring load of the spring portion 38a is applied to the head slider 36.

The gimbal 126 is bent by an angle $\theta2$ at its neck portion 128 continuous to the front end of the suspension 38'. The load point of the spring load is determined by the bending angle $\theta2$. In a conventional head assembly, the bending angle $\theta2$ is preliminarily adjusted so that the load point coincides with the center of gravity of the head slider 36.

In the head assembly 34' according to this preferred embodiment, the bending angle $\theta2$ is set larger than that in the conventional head assembly to thereby shift the load point from the center of gravity of the head slider 36 toward the air inlet end of the head slider 36.

For example, by setting the bending angle $\theta2$ to 3.45°, the load point can be set to substantially coincide with the center of gravity of a plurality of pads (not shown) of the head slider 36. Like the first preferred embodiment, the load point may be set to substantially coincide with an intersection of a longitudinally extending center line of the slider 36 and a transverse line connecting the pads formed near the air inlet end of the slider 36.

According to the present invention, it is possible to eliminate the problem that the lower edge of the air outlet end of the slider may come into contact with the disk surface in the case of reverse rotation of the Hall-less spindle motor during the start of rotation of the disk drive. Accordingly, it is possible to reliably eliminate the problem that the spindle motor may be unable to start rotation because of an increased load.

Accordingly, by using a magnetic disk having a smooth recording surface, the spacing between the head and the disk can be reduced, thereby contributing to an increase in recording density of a disk drive.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A head suspension assembly comprising:
   a suspension having a spring portion for generating a spring load;
   a gimbal located on said suspension, and having a slider mounting portion thereon;

a head slider mounted on said slider mounting portion of said gimbal;

said head slider having a plurality of air bearing surfaces, an air inlet end, and an air outlet end, wherein said air bearing surfaces are located on a plurality of rails that project from said head slider;

a plurality of pads projecting from said air bearing surfaces of said slider; and wherein the spring load of said suspension is applied to said head slider at a load point that is offset from a center of gravity of said head slider, further wherein said offset load point is set to substantially coincide with a center of gravity of said plurality of pads.

2. The head suspension assembly according to claim 1 further comprising:

a reinforcing plate connected to said suspension; and a pivot formed on said reinforcing plate and kept in pressure contact with said slider mounting portion of said gimbal to apply the spring load of said suspension to said head slider.

3. The head suspension assembly according to claim 1 wherein said gimbal is bent at a neck portion thereof by a given angle with respect to said suspension such that the spring load of said suspension is applied to said head slider at said offset load point.

4. The head suspension assembly according to claim 3 wherein said given angle is about 3.45°.

5. The head suspension assembly according to claim 1 wherein said offset load point is located between said center of gravity of said head slider and said air inlet end of said head slider.

6. A head suspension assembly comprising:

a suspension having a spring portion for generating s spring load;

a reinforcing plate connected to said suspension;

a gimbal located on said suspension, and having a slider mounting portion thereon;

a head slider mounted on said slider mounting portion of said gimbal;

a pivot formed on said reinforcing plate and kept in pressure contact with said slider mounting portion of said gimbal to apply the spring load of said suspension to said head slider;

said head slider having a plurality of air bearing surfaces, an air inlet end, and an air outlet end, wherein said air bearing surfaces are located on a plurality of rails that project from said head slider;

a plurality of pads projecting from said air bearing surfaces of said head slider; and said pivot applying the spring load of said suspension to said head slider at a load point offset from a center of gravity of said head slider, wherein said offset load is set to substantially coincide with a center of gravity of said plurality of pads.

7. The head suspension assembly according to claim 6 wherein said gimbal is integrally formed with said suspension.

8. The head suspension assembly according to claim 6 wherein said offset load point is located between said center of gravity of said head slider and said air inlet end of said head slider.

9. A head suspension assembly comprising:

a suspension having a spring portion for generating a spring load;

a gimbal located on said suspension, and having a slider mounting portion thereon;

a head slider mounted on said slider mounting portion of said gimbal;

said head slider having a plurality of air bearing surfaces, an air inlet end, and an air outlet end, wherein said air bearing surfaces are located on a plurality of rails that project from said head slider;

a plurality of pads projecting from said air bearing surfaces of said slider; and said gimbal being bent at a neck portion thereof by a given angle with respect to said suspension so that a load point where the spring load of said suspension is applied to said head slider is offset from a center of gravity of said head slider, wherein said given angle is preliminarily adjusted so that said load point is set to substantially coincide with a center of gravity of said plurality of pads.

10. The head suspension assembly according to claim 9 wherein said given angle is about 3.45°.

11. The head suspension assembly according to claim 9 wherein said gimbal is integrally formed with said suspension.

12. The head suspension assembly according to claim 9 wherein said offset load point is located between said center of gravity of said head slider and said air inlet end of said head slider.

13. A disk drive comprising:

a housing;

a spindle rotatably mounted in said housing;

at least one disk fixed to said spindle;

a motor for rotating said spindle;

a head slider having a head element for reading/writing data from/to said disk; and an actuator for moving said head slider across tracks of said disk;

said actuator including an actuator arm rotatably mounted in said housing and a head assembly mounted on a front end portion of said actuator arm;

said head assembly including:

a suspension fixed at a base end portion thereof to said front end portion of said actuator arm and having a spring portion for generating a spring load;

a reinforcing plate connected to said suspension;

a gimbal located on said suspension, and having a slider mounting portion thereon;

said head slider mounted on said slider mounting portion of said gimbal;

a pivot formed on said reinforcing plate and kept in pressure contact with said slider mounting portion of said gimbal to apply the spring load of said suspension to said head slider;

said head slider having a plurality of air bearing surfaces, an air inlet end, and air outlet end, wherein said air bearing surfaces are located on a plurality of rails that project from said head slider;

a plurality of pads projecting from said air bearing surfaces; and said pivot applying the spring load of said suspension to said head slider at a load point offset from a center of gravity of said head slider; wherein said offset load point is set to substantially coincide with a center of gravity of said plurality of pads.

14. The disk drive according to claim 13 wherein said offset load point is located between said center of gravity of said head slider and said air inlet end of said head slider.

15. A disk drive comprising:

a housing;

a spindle rotatably mounted in said housing;

at least one disk fixed to said spindle;

a motor for rotating said spindle;

a head slider having a head element for reading/writing data from/to said disk; and an actuator for moving said head slider across tracks of said disk;

said actuator including an actuator arm rotatably mounted in said housing and a head assembly mounted on a front end portion of said actuator arm;

said head assembly including:

a suspension fixed at a base end portion thereof to said front end portion of said actuator arm and having a spring portion for generating a spring load;

a gimbal located on said suspension and having a slider mounting portion;

said head slider mounted on said slider mounting portion of said gimbal;

said head slider having a plurality of air bearing surfaces, an air inlet end, and air outlet end, wherein said air bearing surfaces are located on a plurality of rails that project from said head slider;

a plurality of pads projecting from said air bearing surfaces; and said gimbal being bent at a neck portion thereof by a given angle with respect to said suspension so that a load point where the spring load of said suspension is applied to said head slider is offset from a center of gravity of said head slider, wherein said offset load point is set to substantially coincide with a center of gravity of said plurality of pads.

16. The disk drive according to claim 15 wherein said offset load point is located between said center of gravity of said head slider and said air inlet end of said head slider.

17. A head suspension assembly comprising:

a suspension having a spring portion for generating a spring load;

a gimbal located on said suspension, and having a slider mounting portion therein;

a head slider mounted on said slider mounting portion of said gimbal;

said head slider having a plurality of air bearing surfaces, an air inlet end, and an air outlet end, wherein said air bearing surfaces are located on a plurality of rails that project from said head slider;

a plurality of pads projecting from said air bearing surfaces of said slider; and wherein the spring load of said suspension is applied to said head slider at a load point that is offset from a center of gravity of said head slider; and further wherein two of said plurality of pads are formed near said air inlet end of said head slider, and said load point is set to substantially coincide with a position lying on a straight line connecting said two pads.

18. A head suspension assembly comprising:

a suspension having a spring portion for generating a spring load;

a reinforcing plate connected to said suspension;

a gimbal located on said suspension, and having a slider mounting portion thereon;

a head slider mounted on said slider mounting portion of said gimbal;

a pivot formed on said reinforcing plate and kept in pressure contact with said slider mounting portion of said gimbal to apply the spring load of said suspension to said head slider;

said head slider having a plurality of air bearing surfaces, an air inlet end, and an air outlet end, wherein said air bearing surfaces are located on a plurality of rails that project from said head slider;

a plurality of pads projecting from said air bearing surfaces of said head slider; and said pivot applying the spring load of said suspension to said head slider at a load point offset from a center of gravity of said head slider; and further wherein two of said plurality of pads are formed near said air inlet end of said head slider, and said load point is set to substantially coincide with a position lying on a straight line connecting said two pads.

19. A head suspension assembly comprising:

a suspension having a spring portion for generating a spring load;

a gimbal located on said suspension, and having a slider mounting portion thereon;

a head slider mounted on said slider mounting portion of said gimbal;

said head slider having a plurality of air bearing surfaces, an air inlet end, and an air outlet end, wherein said air bearing surfaces are located on a plurality of rails that project from said head slider;

a plurality of pads projecting from said air bearing surfaces of said slider; and said gimbal being bent at a neck portion thereof by a given angle with respect to said suspension so that a load point where the spring load of said suspension is applied to said head slider is offset from a center of gravity of said head slider; and wherein two of said plurality of pads are formed near said air inlet end of said head slider, and said load point is set to substantially coincide with a position lying on a straight line connecting said two pads.

20. A head suspension assembly comprising:

a suspension having a spring portion for generating a spring load;

a gimbal located on said suspension, and having a slider mounting portion therein;

a head slider mounted on said slider mounting portion of said gimbal;

said head slider having an air bearing surface, an air inlet end, and an air outlet end, wherein said air bearing surface is located on at least one rail that projects from said head slider;

a plurality of pads projecting from said air bearing surface of said slider; and wherein the spring load of said suspension is applied to said head slider at a load point that is offset from a center of gravity of said head slider;

wherein two of said plurality of pads are formed near said air inlet end of said head slider, and said load point is set to substantially coincide with a position lying on a straight line connecting said two pads;

wherein said at least one rail includes a first rail and a second rail, where said first and second rails both extend generally along a longitudinal axis of said of head slider; and further wherein said plurality of pads includes a first set of pads on said first rail and a second set of pads on said second rail, wherein said first set of pads and said second set of pads are asymmetrically positioned with respect to each other about a longitudinal axis of said head slider.

21. A head suspension assembly comprising:

a suspension having a spring portion for generating a spring load;

a reinforcing plate connected to said suspension;

a gimbal located on said suspension, and having a slider mounting portion thereon;

a head slider mounted on said slider mounting portion of said gimbal;

a pivot formed on said reinforcing plate and kept in pressure contact with said slider mounting portion of said gimbal to apply the spring load of said suspension to said head slider;

said head slider having an air bearing surface, an air inlet end, and an air outlet end, wherein said air bearing surface is located on at least one rail that projects from said head slider;

a plurality of pads projecting from said air bearing surface of said head slider; and said pivot applying the spring load of said suspension to said head slider at a load point offset from a center of gravity of said head slider;

wherein two of said plurality of pads are formed near said air inlet end of said head slider, and said load point is set to substantially coincide with a position lying on a straight line connecting said two pads;

wherein said at least one rail includes a first rail and a second rail, where said first and second rails both extend generally along a longitudinal axis of said of head slider; and further wherein said plurality of pads includes a first set of pads on said first rail and a second set of pads on said second rail, wherein said first set of pads and said second set of pads are asymmetrically positioned with respect to each other about a longitudinal axis of said head slider.

22. A head suspension assembly comprising:

a suspension having a spring portion for generating a spring load;

a gimbal located on said suspension, and having a slider mounting portion thereon;

a head slider mounted on said slider mounting portion of said gimbal;

said head slider having an air bearing surface, an air inlet end, and an air outlet end, wherein said air bearing surface is located on at least one rail that projects from said head slider;

a plurality of pads projecting from said air bearing surface of said slider; and said gimbal being bent at a neck portion thereof by a given angle with respect to said suspension so that a load point where the spring load of said suspension is applied to said head slider is offset from a center of gravity of said head slider; and wherein two of said plurality of pads are formed near said air inlet end of said head slider, and said load point is set to substantially coincide with a position lying on a straight line connecting said two pads;

wherein said at least one rail includes a first rail and a second rail, where said first and second rails both extend generally along a longitudinal axis of said of head slider; and further wherein said plurality of pads includes a first set of pads on said first rail and a second set of pads on said second rail, wherein said first set of pads and said second set of pads are asymmetrically positioned with respect to each other about a longitudinal axis of said head slider.

\* \* \* \* \*